(12) United States Patent
Gatson et al.

(10) Patent No.: US 9,753,749 B2
(45) Date of Patent: Sep. 5, 2017

(54) INFORMATION HANDLING SYSTEM CONFIGURATION PARAMETER HISTORY MANAGEMENT

(71) Applicant: Dell Products, LP, Round Rock, TX (US)

(72) Inventors: Michael S. Gatson, Austin, TX (US); Joseph Kozlowski, Hutto, TX (US); Yuan-Chang Lo, Austin, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 243 days.

(21) Appl. No.: 14/789,847

(22) Filed: Jul. 1, 2015

(65) Prior Publication Data
US 2017/0003984 A1 Jan. 5, 2017

(51) Int. Cl.
*G06F 15/173* (2006.01)
*G06F 9/445* (2006.01)

(52) U.S. Cl.
CPC ................ *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 7,689,850 B2 | 3/2010 | Cantwell et al. | |
| 7,706,928 B1 | 4/2010 | Howell et al. | |
| 7,873,485 B2 | 1/2011 | Castelli et al. | |
| 8,230,245 B2 | 7/2012 | Khatri et al. | |
| 8,799,695 B2 | 8/2014 | Belt et al. | |
| 2008/0059643 A1 | 3/2008 | Moss | |
| 2008/0271113 A1 | 10/2008 | Belling | |
| 2009/0157333 A1 | 6/2009 | Corrado et al. | |
| 2012/0154171 A1 | 6/2012 | Hurri et al. | |
| 2013/0294291 A1 | 11/2013 | Rasanen | |
| 2014/0095854 A1* | 4/2014 | Chen | G06F 9/4403 713/1 |

* cited by examiner

*Primary Examiner* — Brian Whipple
(74) *Attorney, Agent, or Firm* — Prol Intellectual Property Law, PLLC; H. Kenneth Prol

(57) ABSTRACT

A method and information handling system configured to obtain legacy client information handling system performance data of a legacy client information handling system, to identify legacy client information handling system performance constraints, to receive legacy client information handling system configuration parameter values, information handling system configuration parameter values comprising motherboard configuration parameter values and component configuration parameter values, to identify replacement client information handling system performance enhancements relative to the legacy client information handling system performance constraints based on improved replacement client information handling system capabilities and capacities relative to legacy client information handling system capabilities and capacities, to determine replacement client information handling system configuration parameter values based on the legacy client information handling system configuration parameter values and the replacement client information handling system performance enhancements, and to apply settings of the replacement client information handling system configuration parameter values.

20 Claims, 9 Drawing Sheets

INFORMATION HANDLING SYSTEM CONFIGURATION PARAMETER HISTORY MANAGEMENT

CROSS REFERENCE TO RELATED APPLICATIONS

Related subject matter is contained in co-pending U.S. patent application Ser. No. 14/789,823 entitled "Computing Device Service Life Management," filed on Jul. 1, 2015 (DC-105008), the disclosure of which is hereby incorporated by reference.

FIELD OF THE DISCLOSURE

The present disclosure generally relates to information handling systems, and more particularly relates to configuration parameter management for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
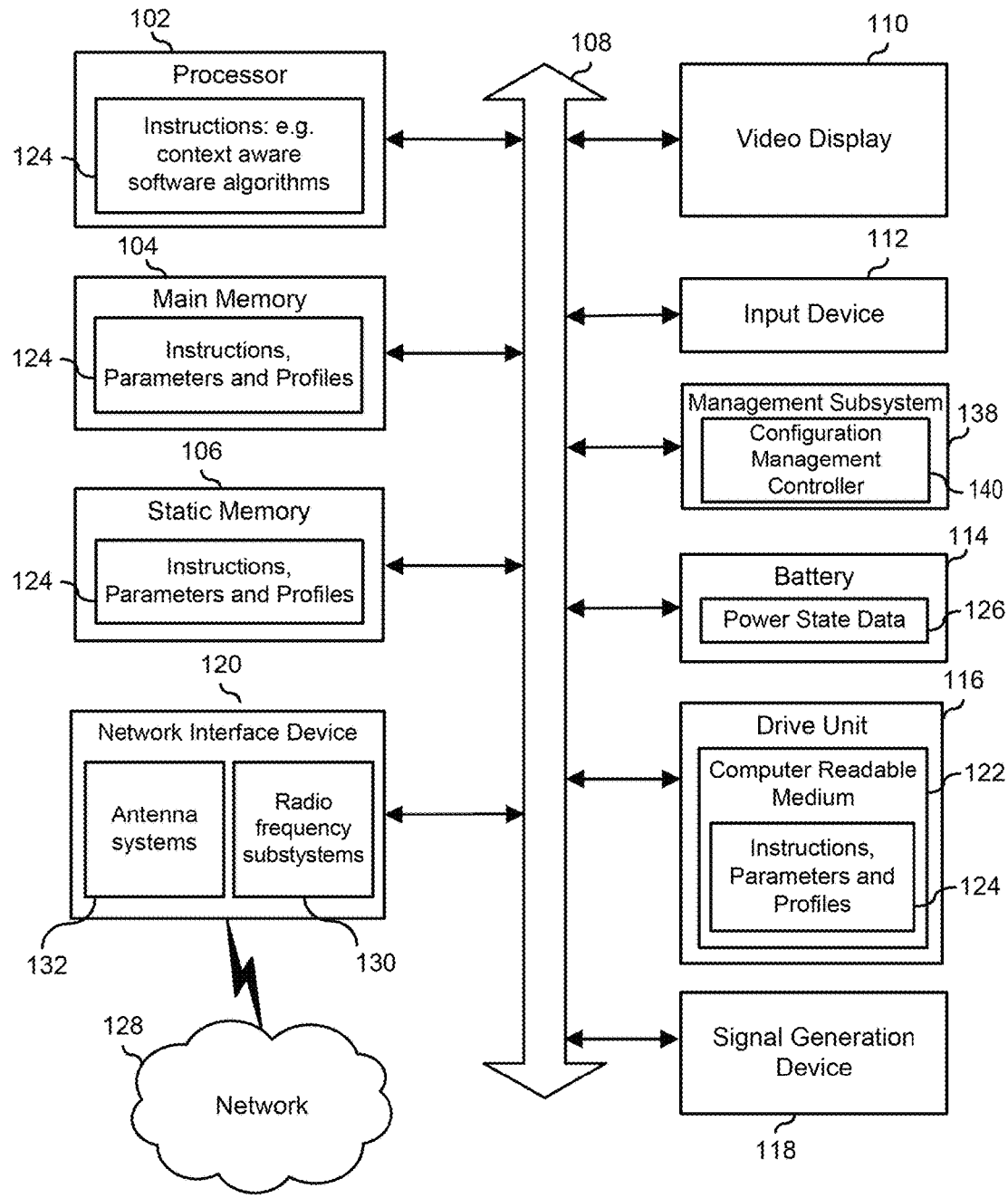
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As a customer migrates from a legacy system, such as a current system, to a replacement system, such as a new system, user settings and profile information generally have not been automatically ported from the legacy system to the replacement system. As used herein, a legacy system can be considered to be a predecessor system to the replacement system, wherein the replacement system replaces legacy system. The replacement system can provide continuity of computing capability previously provided by the legacy system for a particular user or group of users of a customer. Profile and setting information is generally static, e.g., once default values of user settings are changed, typically based largely on user choice or static workload, the modified settings may continue to be used without much, if any, further change. However, a replacement system is typically provided with user settings having default values, which have typically been different than modified settings, as they do not have the benefit of having been modified. Moreover, a replacement system may have new capabilities and capacities beyond those of the legacy system. Thus, while the default values of the user settings may be far from optimal, even the established user settings of the legacy system may not be optimal for the replacement system. As a result, there has been a lost opportunity in some cases to take full advantage of the capabilities and capacities of a replacement system, including improvements in performance, power consumption, storage, graphics, etc.

System data collected and stored during operation of a legacy information handling system can be used to configure a replacement system and to adapt the replacement system to a customer's usage profile obtained based on the system data collected from the legacy information handling system. Thus, for example, for a customer's migration to replacement system, a customer's usage and device history stored in a central system data repository (e.g., Dell® Data Vault) from user's previous system can be used to predict behavior and usage of the customer's new system, and customized values of user settings for the new system can be applied to the new system. To utilize new capabilities and enhancements of the new system, the customized values can include adjustments expected to improve the customer's user experience with the new system and to avoid any shortcomings experienced by the customer based on technological constraints of the previous system that are obviated by the new capabilities and enhancements of the new system. Moreover, when an option among multiple options may be chosen when selecting the features of the new system, the system data collected and stored during operation of the legacy information handling system may be used to select the option among the multiple options.

Detailed device and overall system usage conditions, event occurrences, and their severity can include, for example, data pertaining to power and duty cycle, system and individual device utilization profiles from previous system, thermal stress history, system off/storage conditions, mechanical stress counters, etc. Configuration data from previous system may include, for example, hardware configuration and changes over time, software changes, operating system (OS) changes, basic input output system (BIOS) changes, historic data on repair, etc. The migrated data and records are used to create an initial profile of user data to provide predictive settings on new system. These new settings may be updated over time.

In accordance with at least one embodiment, a method is provided to gather legacy system data from a legacy information handling system and to migrate from the legacy information handling system to a replacement information handling system based on cumulative information on event occurrences and usage behavior to determine a replacement information handling system configuration based on system and component event and usage data collected and stored during operation of a legacy information handling system. As an example, evaluation of the legacy system data may be based on statistical models generated from such data. In accordance with at least one embodiment, such data may comprise data from the legacy information handling system, aggregate data from a plurality of information handling systems, or a combination thereof. In accordance with at least one embodiment, a method to create initial user profile and configuration settings of a replacement system based on event and usage data of a legacy information handling system is provided. In accordance with at least one embodiment, delimiters on new systems are provided based on de-rating previous system impacts based on features of a replacement information handling system.

In accordance with at least one embodiment, a method comprises collecting legacy settings and legacy usage information of a legacy information handling system, determining new settings for a replacement information handling system based on the legacy settings, the legacy usage information, and performance parameter differences of the replacement information handling system with respect to the legacy information handling system; and applying the new settings to the replacement information handling system to transform the replacement information handling system into a customized replacement of the legacy information handling system.

Examples are set forth below with respect to particular aspects of an information handling system. As an example, an upgraded battery charge profile can take into account both a previous need for fast charging and improvements in battery service life, for example, provided by a new generation of battery technology. As another example, an upgraded system with a solid state disk (SSD) drive or a hybrid drive can make use of previous cache utilization to set cache size and content. As a further example, an upgraded system can make use of previous system usage data to modify sleep settings to take advantage of improvements in power consumption to reduce time in hibernation or deeper sleep states. As yet another example, an upgraded system can make use of previous high-end graphics usage to increase nits based on brightness or improve video memory utilization.

Information handling system technology is subject to continual improvement. Customers typically purchase new or more recent information handling systems from time to time. A growing number of customers lease information handling systems from a lessor, such as a system manufacturer, for a period of time, for example three years or so. These legacy information handling systems are replaced with replacement information handling systems after the lease period is over. Determining a suitable replacement information handling system configuration and setting configuration parameters on the replacement information handling system can be problematic. Existing configuration processes typically simply apply default values of configuration parameters and rely on a user to change the configuration parameters at the user's discretion. Such simple configuration processes can require substantial user effort and can lead to suboptimal configuration of the replacement information handling system.

Configuration of replacement information handling systems can benefit from more accurate and granular measurement of customer usage of legacy information handling systems. According to at least one embodiment, a method to track detailed metrics of events and usage during prior use for determining configuration parameter values and applying the configuration parameter values to a replacement information handling system is provided. A comparison of capabilities and capacities of a replacement information handling system to the legacy information handling system it replaces can be used to identify differences in capabilities and capacities between the legacy information handling system and the replacement information handling system. Such differences can be fewer capabilities and lower capacities of the replacement information handling system relative to the legacy information handling system or, more likely, more capabilities and higher capacities of the replacement information handling system relative to the legacy information handling system.

A central information handling system management data repository, such as a data repository, which may be referred to as a data vault, established by an information handling system vendor to store information handling system management data obtained from information handling systems in operation for customers, can be used for obtaining data from which new system configuration parameter values for a replacement information handling system can be determined. The central information handling system management data repository can receive and store data obtained from local instrumentation of a client information handling system. The central information handling system management data repository can be used to implement monitoring and reporting the physical state of a device, extending basic system capabilities to support predictive health reporting and self-remediation, dynamic resource optimization and adaptive behavior. Using a central information handling system management data repository, client information handling systems can be monitored, for example, from the factory even after the systems have been sold and are being used by customers. Key event and usage data can be tracked throughout the life-cycle of the product. Examples of data to be tracked can include the following: detailed device and overall system usage conditions and severity, system and individual device utilization profiles, power parameter values, battery parameter values, system event parameter values, mechanical event parameter values, thermal parameter values, networking parameter values, processor parameter values, memory parameter values, display parameter values, storage parameter values, connector parameter values, and system configuration parameter values. Power parameters can include, for example, power-on hours (including alternating current (AC) power-on hours, battery power-on hours, and the sum of those hours), power cycles, hibernate and sleep state requests, time in sleep states, and duty cycles. Battery parameters can include, for example, relative state of charge (RSOC), charging current, voltage, power, battery cycles, temperature, current drawn, and full charge capacity. System event parameters can include, for example, system thermal events, hardware and operating system (OS) system failure events, motherboard (MB) free fall events, and system-off conditions, such as storage conditions. Mechanical event parameters can include, for example, mechanical cumulative stress counters (accelerometers, free fall, hinge cycles, connector cycles, docking cycles, etc.). Thermal parameters can include, for example, central processing unit (CPU), motherboard, graphics, and memory temperatures, fan revolutions per minute (RPM) parameters, and thermal stress history. Networking parameters can include, for example, percentages of activity for wired and wireless network adapters. CPU and memory parameters can include, for example, memory usage, CPU usage and throttling, and paging activity. Display parameters can include, for example, brightness values and a number of displays. Storage parameters can include, for example, hard disk drive (HDD) parameters such as percentages of time in idle, read, and write states, Self-Monitoring, Analysis, and Reporting Technology (SMART) logs, and HDD free space. HDD parameters can include parameters pertaining to a rotating magnetic or optical disk or to a solid-state memory storage device, such as a flash memory drive. Connector parameters can include, for example, connection status of internal connectors. System configuration parameters can include, for example, a service tag, system type, basic input output system (BIOS) version, hard disk drive (HDD) size and model, battery size, operating system (OS), random access memory (RAM) size, etc. System configuration parameters can include, for example, hardware configuration and changes over time, software/operating system (OS) configuration and changes over time, and historic data on repair and service actions.

The above data and records are used to create models to recommend replacement information handling system configuration decisions on systems. Decisions can include, for example, installation of options in a replacement information handling system and setting of system configuration parameter values in a replacement information handling system. Options in the replacement information handling system can include, for example, upgraded components with additional capability or capacity beyond standard components, economy components with a lower capability or capacity but lower cost than standard components, custom components for specialized usage, and other components other than standard components. Configuration can be performed with or without installation of options before configuration. Options can be selected based on actual legacy information handling system performance history and estimated performance based on features of a replacement information handling system. In accordance with at least one embodiment, a method can be provided to estimate performance of devices of a system or the system as a whole based on legacy information handling system performance history data and statistical models to determine replacement information handling system option selection decisions.

An intelligent configuration management system may access system status monitoring data related to a hardware implementation monitoring system that monitors and stores data relating to usage of component devices and systems in legacy client information handling systems. The hardware implementation monitoring system may operate in the background during operation of the legacy information handling system. Component device utilization data may be collected via numerous source information handling systems, and relate to operation of numerous hardware functions of each client information handling system. Component device utilization data may be retrieved from a variety of sensors including detection of events and usage that may contribute to performance characteristics of the client information handling system and a user's perception of such performance characteristics. Power draw measurements may be conducted on power rails supplying power to individual component devices in the client information handling system or to component devices externally connected to the information handling systems. Power draw measurements can be used to estimate power dissipation and thermal conditions at the individual component devices. Additionally processor activity, controller activity, wireless interface activity, memory/drive activity, and other component activity measurements may also be assessed independently or in connection with power draw measurements. Data representative of events detected by sensors, such as an impact detected by an accelerometer, can be collected. Data representative of events can be detected by system-level sensors, located, for example, on a motherboard of an information handling system, and by component-level sensors, located, for example, at a component, such as a hard disk drive (HDD), of the information handling system. Collected data may be sourced via SMBIOS, Win 32 API, or device drivers to a database repository. An example, hardware implementation monitoring database includes the Dell® Data Vault (DDV) system operational via Windows® or other operating systems. Component device utilization data may be collected and stored on-box locally at a client information handling system, or may be reported remotely to a hub server or servers or a remote data center hosting a DDV or other data repository for a plurality of client information handling systems.

Monitoring is done via network connection and a hardware implementation monitoring system and an intelligent configuration management system having a configuration policy engine. Policy may be implemented on an individualized basis for specific client information handling systems. In other embodiments, configuration policies may be implemented on an enterprise level via feedback of performance and reliability trends for aspects of information handling systems in the enterprise to enable apportionment of configuration policies. In yet other embodiments, sub-groups of enterprise client information handling systems may fall into defined classifications based on many factors, for example configuration index determinations or business factors, and policy applied to classification levels. Appropriate configuration parameter values of individual used information handling systems may therefore be more accurately estimated with system-level event monitoring, component-level event monitoring, system-level usage monitoring, component-level usage monitoring, and a configuration policy may be optimized. Additionally, statistical modeling of parameter values that affect configuration determination across a broader set of information handling systems may more accurately yield an appropriate configuration determination for an individual used information handling system. Enterprise wide configuration policies may also be optimized based on a plurality of factors as described herein.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems of FIG. 2 such as 220, 221, 222, and 224 or servers or systems such as 210 located anywhere within network 200, including the remote data center 290 operating virtual machine applications as described herein. The information handling system 100 may also execute code for hardware implementation monitoring and reporting system and for an intelligent configuration management system that may operate on servers or systems 210, remote data centers 290, or on-box in individual client information handling systems such as 220, 221, 222, and 224 according to various embodiments herein. In other aspects, intelligent configuration management system agents may operate on client information handling systems such as 220, 221, 222, and 224 to log and collect data relating to component device utilization and other use metrics. For example, power draw of various component devices within the client information handling systems 220, 221, 222, and 224 may be measured and logged in a hardware implementation monitoring system data repository such as a Dell® Data Vault by the intelligent configuration management agent operating on the client information handling system. In some aspects, this component device utilization data may be reported back to a hub server or remote data center operating the intelligent configuration management system in accordance with the disclosure herein. In other aspects, some or all of the intelligent configuration management system may operate on-box at the client information handling system to provide configuration indications and other operations.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the intelligent configuration management system disclosed herein. Additionally, instructions 124 may execute the hardware implementation monitoring system disclosed herein and an API may enable interaction between these application programs and device drivers and other aspects of the information handling system and software instructions 124 thereon. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The disk drive unit 116, and static memory 106, also contains space for data storage such as a hardware implementation monitoring system data. Gathered component device utilization data may also be stored in part or in full in data storage 106 or 116 which may serve as some or all of a component device utilization data repository. Further, the instructions 124 may embody one or more of the methods or logic as described herein. For example, instructions relating to the hardware implementation monitoring system, the intelligent configuration management system software algorithms, or the intelligent configuration management agent may be stored here.

In a particular embodiment, the instructions, parameters, and profiles 124 may reside completely, or at least partially, within the main memory 104, the static memory 106, disk drive 116 and/or within the processor 102 during execution by the information handling system 100. Additionally, configuration policy settings, and configuration parameter value estimation profiles and other aspects relating to the intelligent configuration management system functions may be stored in disk drive 116 or static memory 106. Configuration parameter value estimation profiles may be statistical models of system performance, individual component device performance, performance enhancement value estimations, and configuration index determinations performed by an intelligent configuration management system in some embodiments. Parameters may include aspects of component data utilization data to be analyzed with the intelligent configuration management system. Configuration policy requirements may be set by an administrator such as an IT department of an enterprise or be automatically triggered based on performance constraint estimations, performance enhancement estimations, and productivity determinations. Component device utilization data in storage may also include data such as component device utilization data measured by the processor 102 for specific component devices or systems during information handling system operation. In some aspects, intelligent configuration management system parameters may include business factor determinations of enterprise critical applications or high importance information handling systems which may impact configuration index determinations or configuration policy implementations. Such profile business factors may govern parameters and policy around configuration parameter value estimations. As examples, a lower level of performance may be tolerable for lower importance information handling systems, while a higher level of performance may be desired for higher importance information handling systems.

The information handling system may include a power source such as battery 114 or an A/C power source. Battery 114 may include a smart battery system that tracks and provides power state data 126. This power state data 126 may be stored with the instructions, parameters, and profiles 124 such as component device utilization data to be used with the systems and methods disclosed herein.

The information handling system may also have a management subsystem 138 with a plurality of information handling system subsystems for control of a plurality of systems. For example, data relative to the configuration of the information handling system may be collected or managed by a configuration management controller 140 such as configuration management unit that may access other elements shown in FIG. 1, for example, via one or more buses 108. In some aspects, system-level events, component-level events, system-level usage data, and component-level usage data can be collected and managed via the configuration management controller 140. In other aspects, event and usage data may also be monitored with respect to component devices of the information handling system. In some aspects where applicable, execution of configuration policy may be administered partially via the configuration management controller 140.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
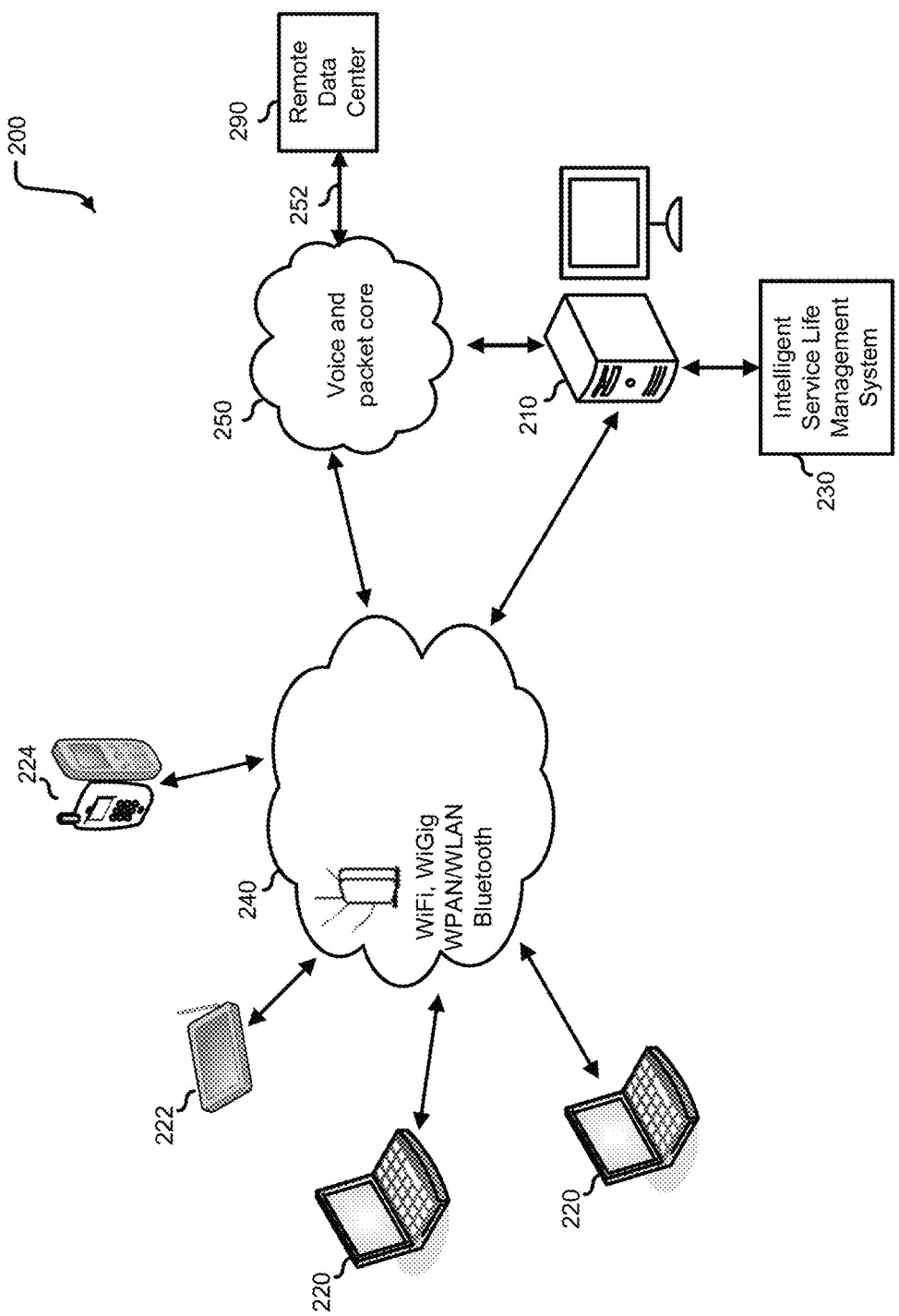
FIG. 2 is a block diagram illustrating a network environment having a plurality of information handling systems according to an embodiment of the present disclosure.

FIG. 2 illustrates a network 200 that can include one or more information handling systems. In a particular embodiment, network 200 includes networked information handling systems 210, 220, 221, 222, and 224, wireless network access points, routers and switches, and multiple wireless connection link options. Systems 210, 220, 221, 222, and 224 represent a variety of computing resources of network 200 including client mobile information handling systems, data processing servers, network storage devices, local and wide area networks, or other resources as needed or desired. In some embodiments, some or all of network 200 may be under control of IT management for a group or enterprise. As specifically depicted, systems 220, 221, 222, and 224 may be a laptop computer, tablet computer, or smartphone device in certain aspects. These user mobile information handling systems 220, 221, 222, and 224, may access a wireless local area network 240, or they may access a macro-cellular network. For example, the wireless local area network 240 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN or similar wireless network protocols. Alternatively, other available wireless links within network 200 may include macro-cellular connections. Macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 250 may contain externally accessible computing resources and connect to a remote data center 290. The voice and packet core network 250 may contain multiple intermediate web servers or other locations with accessible data (not shown). Connection between the wireless network 240 and remote data center 290 may be via Ethernet or another similar connection to the world-wide-web, a WAN, a LAN, another WLAN, or other network structure. Such a connection via WLAN access point/Ethernet switch to the external network may be a backhaul connection. The wireless access point may be connected to one or more wireless access points in the WLAN before connecting directly to a mobile information handling system or may connect directly to one or more information handling systems 210, 220, 221, 222, and 224.

Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 221, 222, and 224 allowing streamlining and efficiency within those devices. Similarly, remote data center 290 permits fewer resources to be maintained in other parts of network 200.

In an example embodiment, the cloud or remote data center 290 may run hosted applications for systems 210, 220, 221, 222, and 224. This may occur by establishing a virtual machine application executing software to manage applications hosted at the remote data center 290. Mobile information handling systems 220, 221, 222, and 224 are adapted to run one or more applications locally, and to have hosted applications run in association with the local applications at remote data center 290 or applications running on another remote information handling systems such as 210. The virtual machine application may serve one or more applications to each of the network connected information handling systems including 210 and client information handling systems 220, 221, 222, and 224. Thus, as illustrated, systems 220, 221, 222, and 224 may be running applications locally while requesting data objects or submitting data objects related to those applications from or to the remote data center 290 and host information handling system 210 via the wireless network. Similarly, system 210 may be running applications locally while requesting data objects or submitting data objects related to those applications from or to the remote data center 290 and receiving or submitting data objects to client information handling systems 220, 221, 222, and 224 via wireless network 240 or voice and packet core 250. For example, a Dell® Data Vault hardware implementation monitoring and reporting application may run locally at systems 220, 221, 222, and 224 and report data back to a host server system 210. In an embodiment, data may then be stored locally, at host system 210, or at a remote data center 290 relating to system status for client information handling systems 220, 221, 222, and 224.

Figure 3:
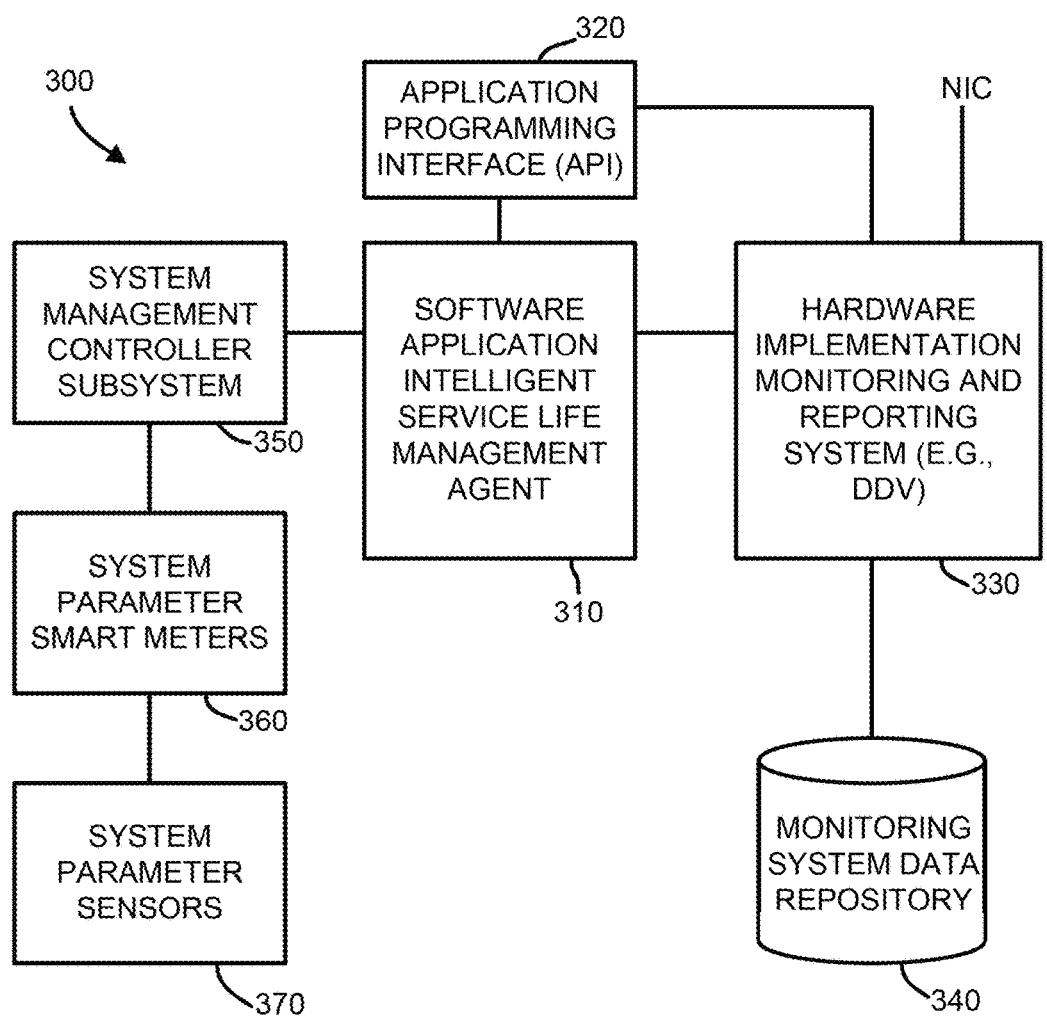
FIG. 3 is a block diagram illustrating components for an aspect of an intelligent system configuration management system according to an embodiment of the present disclosure.

FIG. 3 is a block diagram illustrating components for an aspect of an intelligent system configuration management system according to an embodiment of the present disclosure. The client information handling system of FIG. 3 may execute code to operate an intelligent configuration management system agent 310 that coordinates collection of event and usage data that can include system-level event data, component-level event data, system-level usage data, and component-level usage data, in a client information handling system.

The intelligent configuration management system agent 310 may coordinate with a system configuration controller sub-system 350 to collect component device utilization data for the client information handling system. A system configuration controller sub-system 350 may include connection to a plurality of system parameter smart meters 360 situated to detect system parameter values from a plurality system parameter sensors 370 of component devices and systems in the client information handling system in some embodiments. According to one aspect, smart meters 360 may detect power on supply rails to components such as the CPU, GPU, or the full chipset. Additional component devices including displays, various controllers, both wired and wireless network interface systems, memory, and disk storage systems may have smart meters 360 based on sensors 370 situated to detect system parameter values relevant to configuration of component devices or similar component devices in the client information handling system.

Peripherals among other remotely connected component devices may have intelligent smart meters 360 to report data from system parameter sensors 370 of those information handling system components. In some embodiments, system parameter sensors 370 may be used to identify and measure events and usage relevant to configuration within the information handling system, which may affect performance of the information handling system and a user's perception of such performance. In an aspect, smart meters 360 may monitor system parameter values from the client information handling systems however through peripheral connectors such as USB or similar connections. If this system parameter value measurement for peripherals is not specific to one peripheral, the peripheral component performance levels may be used to provide estimates. Such estimation may be also used for component device system parameter measurements within client information handling systems that may not be outfitted with a complete array of smart meters for component devices in other aspects of the disclosure.

A hardware implementation monitoring and reporting system 330 may monitor performance levels and activity levels of the various component devices or systems of a client information handling system. Such a system will monitor and collect operational activity data and may even include system parameter event occurrences and usage measurements. System parameter measurement may be coordinated between the hardware implementation monitoring system 330 and the intelligent configuration management system 310. For operational activity data collected as part of component device utilization data, data points collected may depend on the component device or system being monitored. For example, a processor or controller such as a CPU, utilization factors such as throughput, latency, availability, service times, throttle, ACPI processor states, thread number, processor queue length or other processing performance or utilization measurements may be taken. In some embodiments, system parameter measurement may take place via the system management controller subsystem 350 of a client information handling system. Activity of each of the plurality of component devices is monitored by the hardware implementation monitoring system 330, for example a Dell® Data Vault system. With this information, usage of component devices may be determined by the intelligent configuration management system agent 310 according to detected activity of the variety of component devices and systems. This usage determination may assess factors including measurements for those component devices.

The intelligent configuration management system 310 may comprise a set of instructions run on CPU or embedded controller in the chipset(s). The intelligent configuration management system 310 interfaces with the application programming interface (API) 320 found in the information handling system software to coordinate various software applications including the hardware implementation monitoring and reporting system 330 and monitoring system data repository 340 for storing component device utilization data. The API 320 may further coordinate the intelligent configuration management system application agent 310, the monitoring and reporting system 330, system parameter smart meters 360, system parameter sensors 370, device drivers of various component devices, and other system performance sensors linked with the hardware implementation monitoring system. The API 320 may also coordinate with the system management controller sub-system 350 and also other system management controllers in various embodiments. These aspects work together to monitor system events, component events, system usage, component usage, and other component device utilization measurements in the one or more client information handling systems of a group or enterprise. Component usage and other usage measurements comprise part of the component device utilization data that is reported back to a centralized intelligent configuration management system. In some aspects, the centralized intelligent configuration management system may coordinate event and usage data across an enterprise or other group of information handling system users. For example, the hardware implementation monitoring and reporting system 330 may report component device utilization data via a network interface (NIC) as shown. The reporting may be ongoing, periodic, or in response to requests for data from the intelligent configuration management system operating remotely at a hub server or remote data center. Any method of data reporting to a centralized intelligent configuration management system is contemplated. The component device utilization data recorded for client information handling systems is also granular in that it may be broken down by component devices within the client information handling systems. Component device utilization data may also be coordinated with operational measurements to identify trends in operation and habits of users and client information handling systems as discussed further herein. Other data may be recorded as well. This may include time/date data, global positioning system information, usage of AC power sources versus battery usage, and the like. This data may also be included in component device utilization data as well as identifying information relating to the client information handling systems that are part of the enterprise or group.

In some embodiments, an intelligent configuration management system may also operate on-box in one or more client information handling systems. In such an embodiment, the monitoring system data repository 340 having component device utilization data may be utilized by the on-box centralized intelligent configuration management agent 310 to prepare event and usage data specific to the client information handling system. In such cases, data from other client information handling systems, such as a similarly situated class of information handling systems, may be received by the client information handling system hosting an on-box intelligent configuration management system to assist in analysis.

The hardware implementation monitoring and reporting system 330 may receive data from a plurality of sensor systems. Sensors can include software and hardware detection mechanisms known in the art to determine performance levels or operation activity of the component devices. It may include additional sensors such as orientation sensors, temperature sensors, data throughput or processing detection systems, and other component device performance detection systems. Orientation sensors, for example, may include one or more digital gyroscopes, accelerometers, and magnetometers in example aspects. As another example aspect, temperature sensors may include thermistors or other temperature sensing systems. Sensor system data may be accumulated at an accumulator sensor hub.

Figure 4:
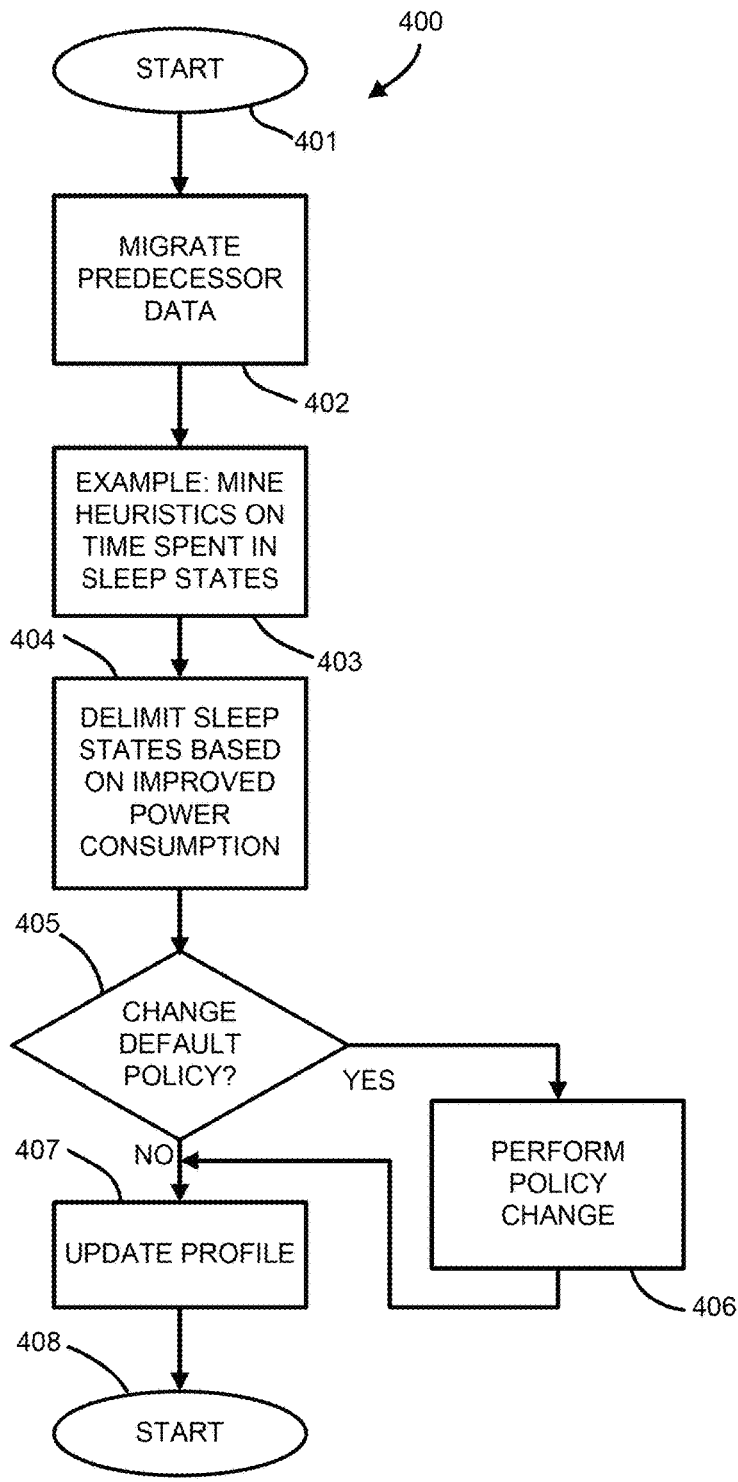
FIG. 4 is a flow diagram illustrating a method a method of information handling system configuration management according to an embodiment of the present disclosure.

FIG. 4 is a flow diagram illustrating a method of information handling system configuration management according to an embodiment of the present disclosure. While method 400 is described, by way of illustration, with respect to a particular system parameter, such as time spent in sleep states, it should be understood that method 400 may be performed with respect to other system parameters and combinations thereof, as will be described in more detail below. Method 400 begins in block 401 and continues to block 402. In block 402, predecessor data from a legacy information system is migrated. As an example, the predecessor data is migrated to a management information handling system or to a replacement information handling system. The predecessor data can include, for example, legacy information handling system performance data and legacy information handling system configuration parameter values. From block 402, method 400 continues to block 403. In block 403, system data is mined from a data vault. As an example, system data including heuristics on time spent in sleep states are mined from a data vault, such as a Dell® Data Vault. Such system data show performance of a legacy information handling system based on actual use of the legacy information handling system according to legacy information handling system configuration parameter values and hardware and software constraints of the legacy information handling system. Given the relative freedom of a replacement information handling system from similar hardware and software constraints, replacement information handling system configuration parameter values can be determined so as to be optimized for comparative hardware and software capabilities and capacities of the replacement information handling system. From block 403, method 400 continues to block 404. In block 404, limitations imposed by the legacy information handling system but not imposed by the replacement system are removed, for example, by determining replacement information handling system configuration parameter values that result in removal of the limitations. As an example, sleep states of the legacy information handling system are mitigated (e.g., delimited) based on improved power consumption of the replacement information handling system. For example, when the time spent in sleep states can be obtained from a data vault that stores system performance data for a legacy information handling system, and power consumption, battery capacity, power cycle patterns, and other power related performance data of the legacy information handling system can be retrieved, and that power related performance data can be compared to enhanced power capabilities and capacities of a replacement information handling system, such as reduced power consumption, increased battery capacity, and decreased battery charging time, then a power performance enhancement of the replacement information handling system relative to the legacy information handling system can be determined. Based on the power performance enhancement, replacement information handling system power configuration parameter values can be determined to cause the replacement information processing system to spend less time in sleep states, to enter sleep states fewer times, or to use shallower sleep states than was the case with the legacy information handling system. Thus, mitigation of performance limitations, such as sleep states, of a legacy information handling system can be achieved by determining replacement information handling system configuration parameter values by taking into account performance enhancements of the replacement information handling system over the legacy information handling system. From block 404, method 400 continues to decision block 405. In decision block 405, a decision is made as to whether or not a default policy is to be changed. As an example, the decision to change to a different policy than the default policy can be made based upon determination of replacement information handling system configuration parameter values that differ from default replacement information handling system configuration parameter values. If the default policy is to be changed, method 400 continues to block 406. In block 406, a policy change is performed. From block 406, method 400 continues to block 407. If, at decision block 405, the decision was made that the default policy is not to be changed, method 400 continues to block 407. In block 407, the profile is updated according to the preceding operations. From block 407, method 400 continues to block 408, where it ends.

While method 400 of FIG. 4 is described with respect to time spent in sleep states, other examples of system parameters with respect to which FIG. 4 may be implemented are set forth below with respect to particular aspects of an information handling system. As an example, block 403 may be implemented to mine heuristics on battery charging cycles, charging rates, battery capacities, and battery service lives, with block 404 providing an upgraded battery charge profile that takes into account such legacy system battery performance data and improvements in battery service life, for example, provided by a new generation of battery technology, as may be available for a replacement system. As another example, block 403 may be implemented to mine heuristics on previous cache utilization, and block 404 may be implemented to provide storage parameter values to allow an upgraded system, for example, with a solid state disk (SSD) drive or a hybrid drive, to make use of updated values based on previous cache utilization to set cache size and content for the replacement system. As a further example, block 403 may be implemented to mine system parameters values for graphics processor usage, and block 404 may be implemented to provide graphics configuration parameter values to allow an upgraded system, for example, to increase nits for a graphics display based on brightness or to improve video memory utilization.

As is the case in the illustrated example of FIG. 4, in accordance with any of the additional examples set forth above, from block 404, method 400 continues to decision block 405. In decision block 405, a decision is made as to whether or not a default policy is to be changed. As an example, the decision to change to a different policy than the default policy can be made based upon determination of replacement information handling system configuration parameter values that differ from default replacement information handling system configuration parameter values. With respect to the battery charging example, if battery configuration parameter values are updated for the replacement system, the default battery policy can be indicated to be changed. With respect to the cache utilization example, if cache configuration parameter values are updated for the replacement system, the default cache policy can be indicated to be changed. With respect to the graphics processor usage example, if graphics processor configuration parameter values are updated for the replacement system, the default graphics processor policy can be indicated to be changed. In an embodiment where blocks 403 and 404 relate to multiple aspects of the replacement system, such as one or more of the examples set forth above, a default policy can indicated to be changed for any of such aspects for which updated configuration parameter values are determined. If the default policy is to be changed, method 400 continues to block 406. In block 406, a policy change is performed. From block 406, method 400 continues to block 407. If, at decision block 405, the decision was made that the default policy is not to be changed, method 400 continues to block 407. In block 407, the profile is updated according to the preceding operations. If change is indicated with respect to only one aspect, such as those examples set forth above, then the profile can be updated with respect to that aspect. If change is indicated for multiple aspects, then the profile can be update with respect to each of the multiple aspects. From block 407, method 400 continues to block 408, where it ends.

Figure 5:
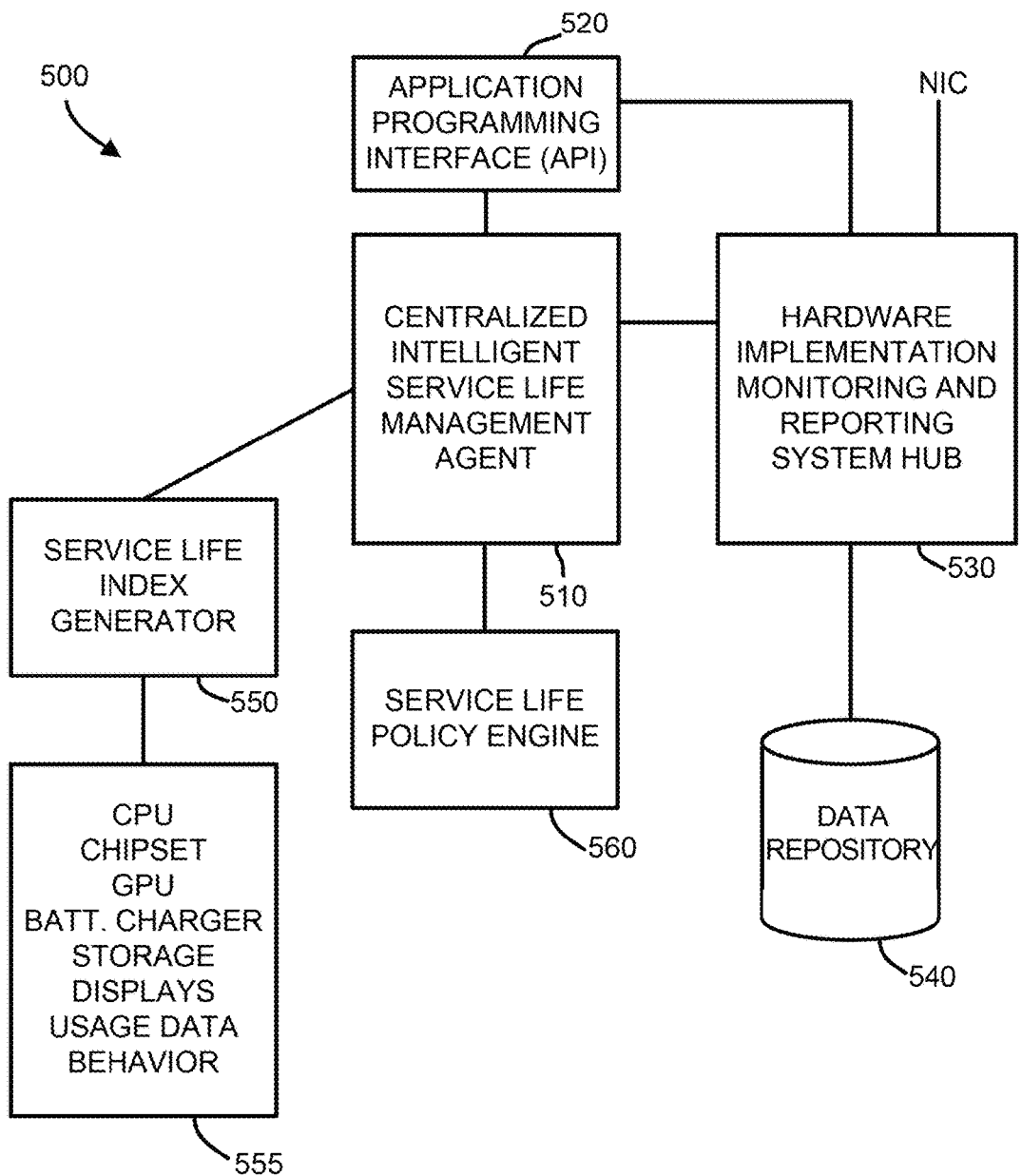
FIG. 5 is a block diagram illustrating components for another aspect of an intelligent configuration management system according to an embodiment of the present disclosure.

FIG. 5 is a block diagram illustrating components for another aspect of an intelligent configuration management system 510 and a hardware implementation monitoring and reporting system hub 530 according to an embodiment of the present disclosure. The intelligent configuration management system 510 and a hardware implementation monitoring and reporting system 530 may be hosted on a central server or at one or more remote data centers or some combination. In other embodiments, the intelligent configuration management system 510 and a hardware implementation monitoring and reporting system 530 may operate from one or more client information handling systems. The intelligent configuration management system 510 and hardware implementation monitoring and reporting system 530 may be deployed by an enterprise IT department to monitor event and usage data across the enterprise by client information handling systems supported by the enterprise. It is understood that the disclosure herein is not limited to an enterprise and may be applied to any group of supported information handling systems whereby the intelligent configuration management system 510 is used to monitor event and usage data and predict estimates of performance constraints and performance enhancements. The intelligent configuration management system 510 may also be used to generate or establish configuration policies based on performance estimation and other factors including enterprise critical system or user functions with the client information handling systems. In certain embodiments, the intelligent configuration management system 510 and hardware implementation monitoring and reporting system 530 may operate on-box on an individual client information handling system instead of as a centralized system to determine predicted performance enhancements of that client system and establish configuration policies. Such a localized intelligent configuration management system 510 may nonetheless coordinate and report to a centralized intelligent configuration management system in some embodiments.

Some or all of hardware implementation monitoring system data repository may also be stored at an enterprise server, at one or more remote data centers, or at some combination. The server information handling system executes code to operate the intelligent configuration management system 510. As a host to a network of enterprise client information handling systems, the intelligent configuration management system 510 and hardware implementation monitoring and reporting system 530 can coordinate collection of component device utilization data from a plurality of client information handling systems supported by the enterprise (or other grouping). For example, the intelligent configuration management system 510 and the hardware implementation and reporting system 530 can obtain component device utilization data showing utilization of component devices of the plurality of client information handling systems via a network interface card (NIC) shown attached to the hardware implementation and reporting system 530 and can store the component device utilization data at data repository 540. As described above, the component device utilization data can include power draw data, including power cycle data, for component devices of the client information handling systems as well as other data.

The intelligent configuration management system 510 may comprise a set of instructions run on CPU or embedded controller in the chipset(s) of one or more host devices. The intelligent configuration management system 510 interfaces with the application programming interface (API) 520 found in the host information handling system software to coordinate various software applications including the hardware implementation monitoring and reporting system hub software code 530 and accesses to monitoring system data repository 540 for component device utilization data. The API 520 may coordinate the intelligent configuration management system application 510 and the monitoring and reporting system 530 to conduct performance estimation across the client information handling systems supported by the group or enterprise.

The monitoring system data repository 540 may store event and usage data and other component device utilization data such as identification data for supported client information handling systems. Additional data that may be stored at the monitoring system data repository 540 may include GPS data and timing or calendar data for supported client information handling systems. The intelligent configuration management system 510 may access the component device utilization data from a plurality of client information handling systems to determine performance estimates across the enterprise. A configuration policy engine 560 coupled to intelligent configuration management system 510 may be used to implement a configuration policy.

A configuration index generator 550 is a sub-part of the intelligent configuration management system 510 in some aspects. The configuration index generator 550 may operate to determine or rank event or usage levels of individual client information handling systems supported within the enterprise or group. Legacy information handling system performance assessment by the configuration index generator 550 may assess event occurrences and usage levels of component devices 555 within client information handling systems. Examples of such component devices 555 include a CPU/chipset, memory, GPU, disk/flash storage, battery charger, displays, network usage, other usage and behavior, or assessment of applications hosted by the client system when determining a performance ranking for the client information handling system. Configuration index rankings may be applied to classify plurality of similarly-situated client information handling systems by estimated performance class within the enterprise as well. Business factors may also affect performance rankings or classifications. For example, client information handling systems configuration may be affected by tasks regularly performed on them by users. Those tasks may be high priority activity to the enterprise or group. In other examples, the users assigned to certain supported client information handling systems may have a high ranking importance within the enterprise for which high performance estimates may take a priority. These business factors may affect performance classifications for some client information handling systems. For example, configuration index rankings of client information handling systems may be affected by the user of the client system. In an aspect, the executive levels of users may factor into the configuration index. These enterprise business factors may impact the determination of configuration index calculations for client information handling systems.

In some embodiments, the configuration index assessment may even be made at the level of component device configuration within client information handling systems. In these examples, a configuration index may be assessed for particular component devices and systems. As a result, event occurrence, usage measurement, and performance estimation for those component devices may be assessed and configuration policy tailored according to component device performance estimations. Thus, performance assessments may be made for client information handling systems that typically perform tasks involving certain component devices or sub-groupings of devices. For example, the tasks performed by users of the client information handling system may emphasize certain component devices over others. Those component devices may receive higher or lower configuration indices as a result which may later factor into configuration policy determinations.

Performance estimates may be established by the intelligent configuration management system 510 with access to historic component device utilization data stored in monitoring system data repository 540. In an aspect, the component device utilization data from monitoring system data repository 540 is data collected over a period of time from the client information handling system being assessed to discern trends of usage. In other embodiments, the intelligent configuration management system 510 may assess data from a subset of similarly situated client information handling system to discern trends in event occurrence and component system utilization. In yet other embodiments, the intelligent configuration management system 510 may access component device utilization data for all available client information handling systems to compare or contrast utilization and determine estimated performance within portions of the enterprise.

Performance estimates may be conducted differently for the variety of component devices of each client information handling system or of a class of client information handling systems in certain embodiments. The intelligent configuration management system may assess this configuration index and performance estimation based on event and usage history stored with component device utilization data in the monitoring and reporting system and monitoring system data repository. In some embodiments, this determination of performance estimates and configuration indices may impact system usage policies established by a configuration policy engine for the enterprise IT department.

In other embodiments, an intelligent configuration management system may also operate on-box on a client information handling system. The intelligent configuration management system 510 may coordinate with a system management controller sub-system to collect component device utilization data for the client information handling system for performance estimation on-box. In such an on-box embodiment, the monitoring system data repository 540 having component device utilization data may be utilized by the on-box intelligent configuration management system to prepare performance estimates specific to the client information handling system. The on-box component device event and utilization data and performance estimations for the client information handling system may be networked with a hub host system to share on-box performance estimations across an enterprise in some example embodiments. In such cases, data from other client information handling systems, such as a similarly situated class of information handling systems, may be received by the host information handling system hosting an intelligent configuration management system 510. It is understood that the host information handling system of the intelligent configuration management system 510 may be a host server, remote data center, or another client information handling system in various embodiments.

Figure 6:
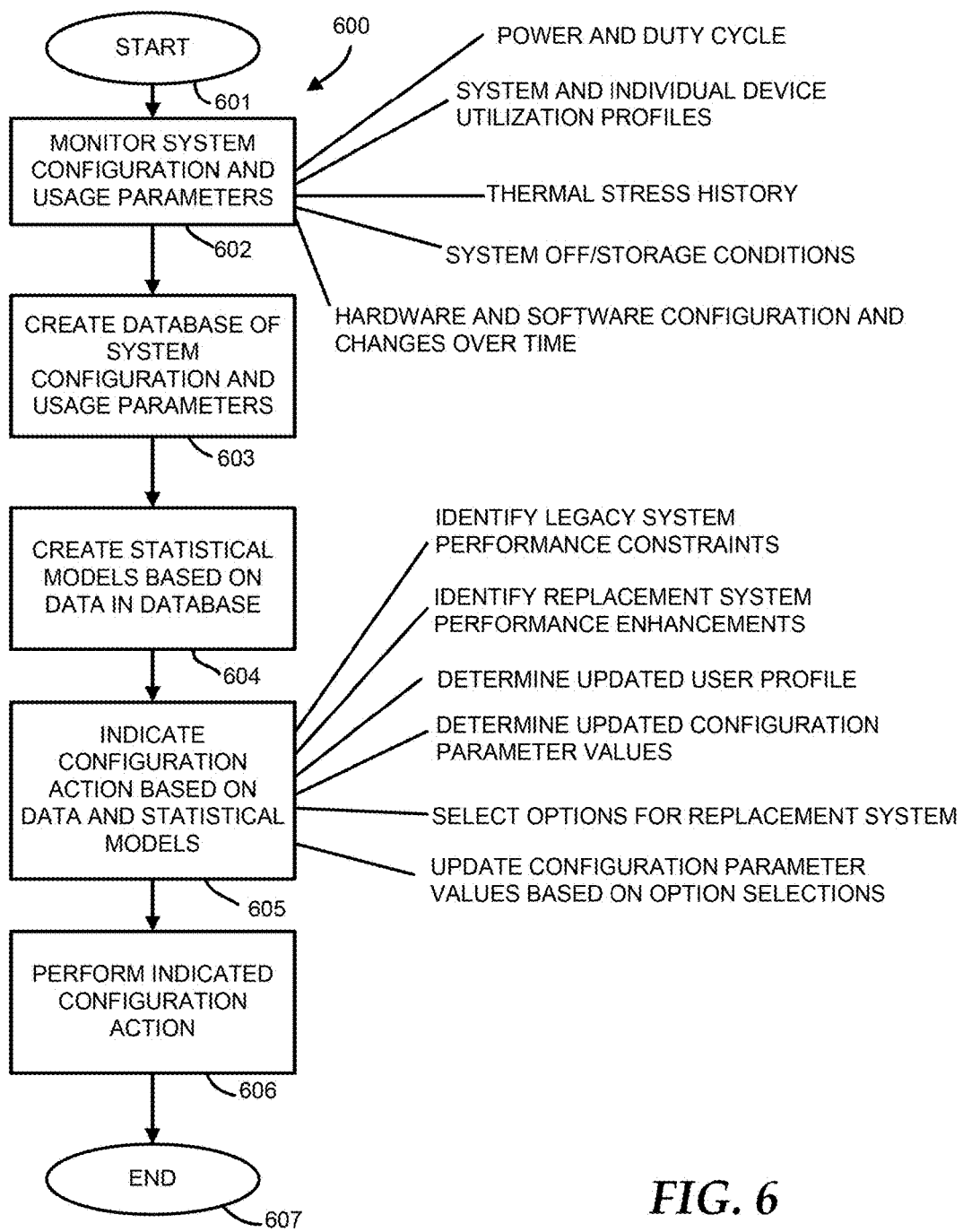
FIG. 6 is a flow diagram illustrating a method of information handling system configuration parameter value determination according to an embodiment of the present disclosure.

FIG. 6 is a flow diagram illustrating a method 600 of information handling system configuration action indication determination for one or more client information handling systems from data received from across a plurality of client information handling systems associated with a group or enterprise according to an embodiment of the present disclosure. Method 600 begins at block 601. From block 601, method 601 continues to block 602. In block 602, system configuration and usage parameters are monitored. Examples of the system usage parameters include power and duty cycle, system and individual device utilization profiles, thermal stress history, system off/storage conditions, and hardware and software configuration parameters and their changes over time. From block 602, method 600 continues to block 603. In block 603, a database of system configuration and usage parameters is created. From block 603, method 600 continues to block 604. In block 604, statistical models are created based on data in a database. From block 604, method 600 continues to block 605. In block 605, an indication for a configuration action is provided based on the data and statistical models. Examples of possible configuration actions include identification of legacy system performance constraints, identification of replacement system performance enhancements, determination of an updated user profile, determination of updated configuration parameter values, selections of options for a replacement system, and updating of configuration parameter values based on option selections. From block 605, method 600 continues to block 606. In block 606, the indicated configuration action is performed. From block 606, method 600 continues to block 607. In block 607, method 600 ends.

In accordance with at least one embodiment, a host system may initiate the intelligent configuration management system code on the host device or remote data server if not already initiated. The host device or remote data servers may serve as a centralized intelligent configuration management system in an embodiment.

In accordance with at least one embodiment, the intelligent configuration management system monitors event occurrences and usage measurements for client information handling systems associated with a group or enterprise. As and example, intelligent configuration management system agent software located on one or more client information handling systems of the enterprise may take measurement of component device utilization data. This component device utilization data may include event and usage data for component devices or systems in each monitored client information handling system. Some portion of the client information handling systems associated with an enterprise or group may be monitored in some embodiments. In other embodiments, all client information handling systems associated with a group or enterprise may be monitored.

In accordance with at least one embodiment, the intelligent configuration management system may initiate a request for component device utilization data from one or more monitored client information handling systems. If a request for data has not been issued, client information handling systems continue to be monitored by the intelligent configuration management system agents and the hardware implementation monitoring and reporting systems embedded thereon. If a request is issued, component device utilization data is retrieved from one or more client information handling systems. In other embodiments, it is understood that the intelligent configuration management system agent and hardware implementation monitoring and reporting system may report component device utilization data to a monitoring system data repository at any time from a monitored client information handling system in various embodiments. For example, the intelligent configuration management system agent may report component device utilization data to the intelligent configuration management system including by its own initiation, periodic reporting, reporting triggered by an event or threshold such as detection of new data, or any combination. Thus, in some embodiments, issuance of a request for component device utilization data may not be necessary. Security measures including encryption and security verification may be deployed in the course of communications of reported component device utilization data.

In accordance with at least one embodiment, data from monitored client information handling systems is stored in a monitoring system data repository as described above. As an example, the intelligent configuration management system code will access current component device utilization data stored in the monitoring system data repository. Accessed data may include component device event and usage data as well as other component device utilization data.

In accordance with at least one embodiment, intelligent configuration management system will determine what performance estimation parameters will be used in performance estimation. The performance estimation parameters may determine the bounds or view of performance estimation desired by the IT manager or other users of the intelligent configuration management system. The component device utilization data collected by the intelligent configuration management system is complete enough to provide a high degree of confidence in performance estimations. Furthermore, the completeness of the data gathered by the intelligent configuration management system permits a wide set of optional parameters to be applied to view specific aspects performance estimation.

Performance estimation parameters may include application of determined configuration indices of client information handling systems associated with the enterprise or group. The configuration indices of the client information handling systems may be determined in accordance with disclosures herein and may include analysis of component device utilization data to track trends in activity of component devices or systems. Determination of configuration indices may also be subject to performance estimation parameter settings set by an enterprise or group IT administrator or other user. Configuration indices may be used to classify groups of client information handling systems and those classifications may serve as performance estimation parameters in example embodiments. Other performance estimation parameters determined can include periods of time or use, days of usage, physical locations, selection of particular component devices for analysis, and utilization rates to estimate performance, among other parameters as may be understood can be applied to performance estimation of the present disclosure.

In accordance with at least one embodiment, intelligent configuration management system will utilize time specific data from the component device utilization data for individual client information handling systems to determine time-based trends of utilization across the enterprise. This data may be specific to days of the week or to overall daily utilization trends. Also, the time-based trends may be applied to all measured client information handling systems or may be broken down by class of client information handling system within the group or enterprise in some embodiments. In other embodiments, the time-based trends may also reflect utilization trends for specific device components or categories of device components within the enterprise client information handling systems. Time-based trends may also include time-series performance estimation data useful to generate statistical models or to calculate future performance within parts or all of an enterprise.

In accordance with at least one embodiment, the intelligent configuration management system will determine a statistical model for future performance across the group or enterprise based on the historical trends of events and usage affecting performance. The statistical model may also be time-based and specifically reflect expected daily trends or trends expected for given days of the week. Seasonal trends may also play a factor. In some embodiments, the statistical model of events and usage affecting performance across the enterprise may be broken down by configuration index class of client information handling system within the group or enterprise in some embodiments. In some embodiments, statistical models of events and usage data affecting performance may be made for specific component devices or categories of device components within the enterprise client information handling systems to allow IT professionals to review trends in event occurrence and device utilization specific to aspects of operation of the client information handling systems at a device component or system level. The estimates of demand may take into account various factors to adjust the performance estimation. For example, battery usage by client information handling systems will shift power consumption levels to a time of when battery charging is conducted with A/C power. In another example adjustment, client information handling system GPS data may be used to discern that a user may be travelling, or working from home. GPS data for client information handling systems will also allow performance estimation to be determined according to locations such as enterprise-owned buildings or campuses. Such trends of travel/work from home may be modeled as well for a portion of the client information handling systems to adjust the modeled estimates of performance of client information handling systems in an enterprise.

Time-based statistical models that track statistical confidences for time-based trend data may also permit IT managers to identify constraints in estimated performance based on historical event and usage data affecting performance in component device utilization data. Identification of future performance constraints, such as may occur based on performance limitations of individual components, allows an enterprise to prepare for or predict usage patterns and configuration parameter settings for which such performance limitations may become evident, and set in motion policies to mitigate performance constraints. With the intelligent configuration management system, performance estimate calculations carry an improved degree of statistical confidence and may be tailored to specific client information handling systems or their component devices.

Because the device component utilization data is available at a very specific level from the monitored client information handling systems, a substantially accurate and dynamic statistical performance calculation may be made to estimate future performance for different configuration parameter values, different system baseline capabilities and capacities, and different installed options. Furthermore, because of the granularity of the device component utilization data available to the intelligent management system, statistical models of several facets of estimated performance may be determined. Likewise, time-based statistical modeling of performance also permits IT managers to identify constraints in estimated performance such as during peak need timeframes with respect to specific component devices or sub-groups of component devices deployed in the enterprise within client information handling systems. For example, peak usage indicators may be determined for battery charging components, network interface components, display components, CPUs, GPUs, and the like. This identification of peak usage indicators with respect to component devices may be a powerful analysis tool for enterprise IT managers.

The statistical model of performance estimation may be determined based on several limitations placed on the data as described above. In various embodiments, a statistical model of data for events and usage may be made with respect to particularized times, seasons, locations, class or sub-grouping of information handling system, component devices, or other parsing of the gathered device component utilization data. Similarly, as shown in certain embodiments herein, a statistical model for overall events and usage affecting performance across the enterprise or other group may be conducted as well by the intelligent configuration management system. Depending on the analysis required, it is understood that the intelligent configuration management system may conduct either parametric or non-parametric statistical analysis of the data to yield a demand estimation model with substantial accuracy and confidence levels for use by IT professionals for the enterprise or group. The parametric or non-parametric statistical model of performance may be made by the intelligent configuration manager to determine probability distributions for event and usage levels depending on availability and accuracy of statistical parameter assumptions in accordance with several understood statistical analysis techniques.

Various statistical models may be used and applied to the variety of aspects of the component device utilization data described herein. For example, in an embodiment, a non-parametric kernel density estimate model may generate a probability density function to estimate events and usage affecting performance over a given period of time among a population of client information handling systems. In another embodiment, the kernel density estimate may be applied to data for specific to types of component devices or systems in the population of client information handling systems monitored for component device utilization data and including events and usage affecting performance. Other statistical modeling may be used as is understood. For example, a parametric statistical model may be used in which an assumed performance distribution function may be selected and the component device utilization data curve fit to the presumed base model in certain embodiments. Parametric models, such as normalized or lognormal parametric models, may yield additional accuracy assuming a properly selected base set of assumptions of the event and usage distribution over a population of client information handling systems or other aspects of component device utilization data as is understood. By statistical analysis of event and usage data for a plurality of client information handling systems throughout an enterprise, performance occurrence within the enterprise may be estimated with a reasonable certainty. Moreover, the component device specificity of the component device utilization data allows for statistical performance estimation at a granular level for classes of component devices across some or all of the enterprise. Further, the intelligent configuration management system provides for flexibility in determining and accounting for events and usage of individual enterprise client information handling systems alone and in relation to the entire enterprise.

In accordance with at least one embodiment, the intelligent configuration management system will apply event and usage rates to the modeled estimates of performance for the enterprise client information handling systems to yield estimated performance for information handling systems in the enterprise. The performance estimate may be a time-series estimate as above described above. In some embodiments, a performance estimate may be modeled by day of the week, seasonally, or otherwise. The estimated performance also may be broken down as before by classification of client information handling systems, by locations within the enterprise or group, or by component devices or subsets of component devices in various embodiments. The performance estimate may shift depending on time of day usage for the enterprise or may shift depending on time of year. The estimated performance may be a location-based estimate or some combination of time or location basis. Performance may shift depending on location of the consuming client information handling system. Furthermore, adjustments to performance estimation similar to the above described adjustments may also factor into adjustment to the modeled estimates of performance. Other factors may also impact the cost of replacing information handling systems to an enterprise or group utilizing the intelligent configuration management system of the present disclosure.

In accordance with at least one embodiment, the intelligent configuration management system may have configuration limitations or target caps by which IT personnel aim to control service and reliability issues. The configuration limitations may be made according to budget or environmental considerations. The intelligent configuration management system may indicate via the modeled time-based performance estimation time periods where estimated performance may reach one or more thresholds set during periods of time. These indicators may be used by IT personnel to provide for additional budgeting for upgraded options to be installed in information handling systems or to implement measures to reduce impacts of performance constraints, for example, by utilizing at least one embodiment disclosed herein to determine replacement information handling system configuration parameter values for a replacement information handling system. It is understood that the steps performed above need not be performed in any particular order. Additionally, some steps may not be performed or other steps may be added to the embodiment described above. Embodiments are contemplated to include any portions of the above embodiment in any order and in combination with other embodiments as is understood.

Figure 7:
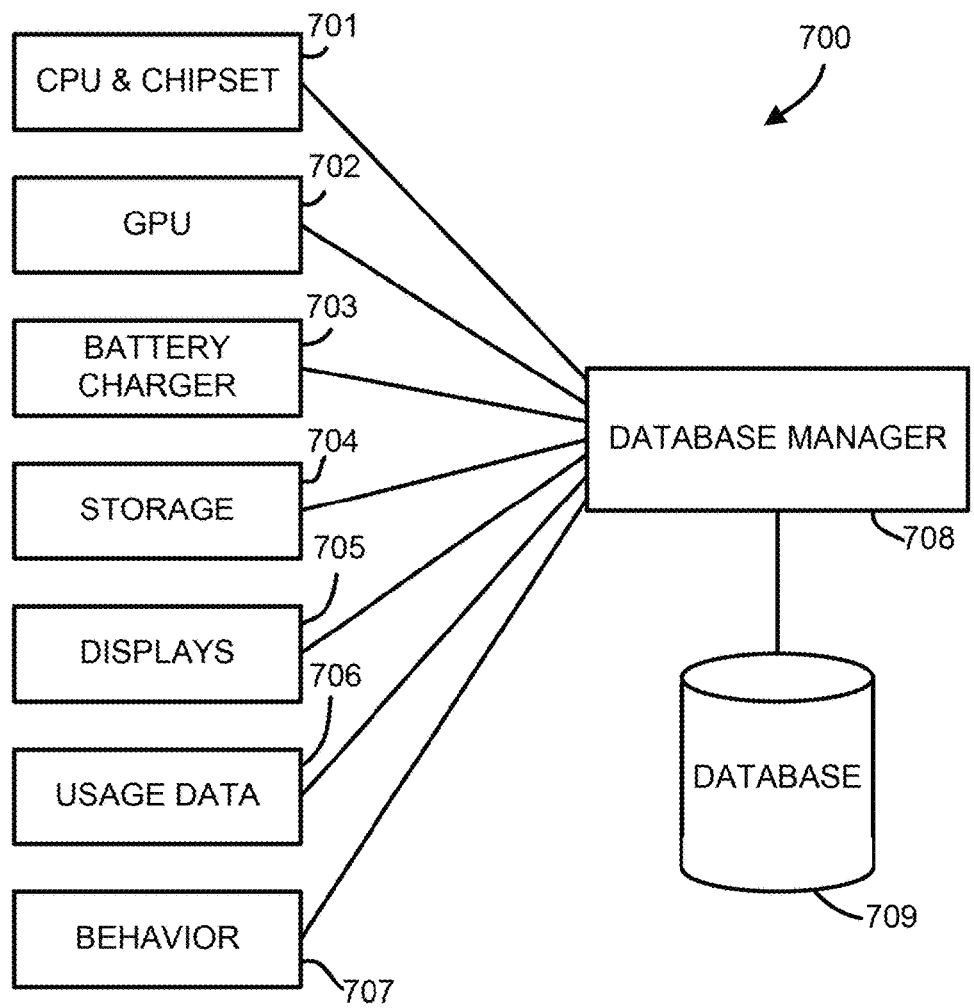
FIG. 7 is a graphical chart illustrating an example of configuration management for one or more client information handling systems according to an embodiment of the present disclosure.

FIG. 7 is a graphical chart illustrating an example of configuration management for one or more client information handling systems according to an embodiment of the present disclosure. FIG. 7 illustrates by graphic depiction the process of component device historical usage data collection including collection of usage and configuration information for use via the intelligent configuration management system of the present disclosure. Components, which can include, for example, CPU & chipset 701, GPU 702, battery charger 703, storage 704, displays 705, usage data 706, and behavior information 707, and configuration parameter values 710 are coupled to database manager 708. Database manager 708 is coupled to database 709. The assortment of component devices or systems monitored for events and usage affecting performance and configuration is shown at 701 through 707 and 710. The present embodiment may include power measurements made from power supply rails to component devices including the CPU, chipset, GPU, battery charger, storage/drive devices, displays, and other component devices as described above. Each monitored client information handling system, as described, may have intelligent configuration management system agents conduct event and usage data collection. The monitoring and reporting system operating on the monitored client information handling system may report event and usage data and other component device utilization data back to the centralized intelligent configuration management system and the monitoring system data repository. Other components, such as peripherals or network connected devices operating via the client information handling system may not have event and usage measurement of their own available. In such cases, usage and performance estimates may be made based on duty cycle of power consumption, component device operation, or monitoring of total system events and usage data and configuration parameter values.

Intelligent configuration management system assesses overall event and usage data for the various component devices of the client information handling systems in a group or enterprise. The event and usage data along with additional component device utilization data may be used to determine time-series data illustrating usage and performance estimations according to statistical models applied. In an example embodiment for a monitored client information handling system, component device power consumption measurements may be summed to provide a total power consumption level. Data from a plurality of client information handling systems may be then summed or extrapolated across an enterprise.

Figure 8:
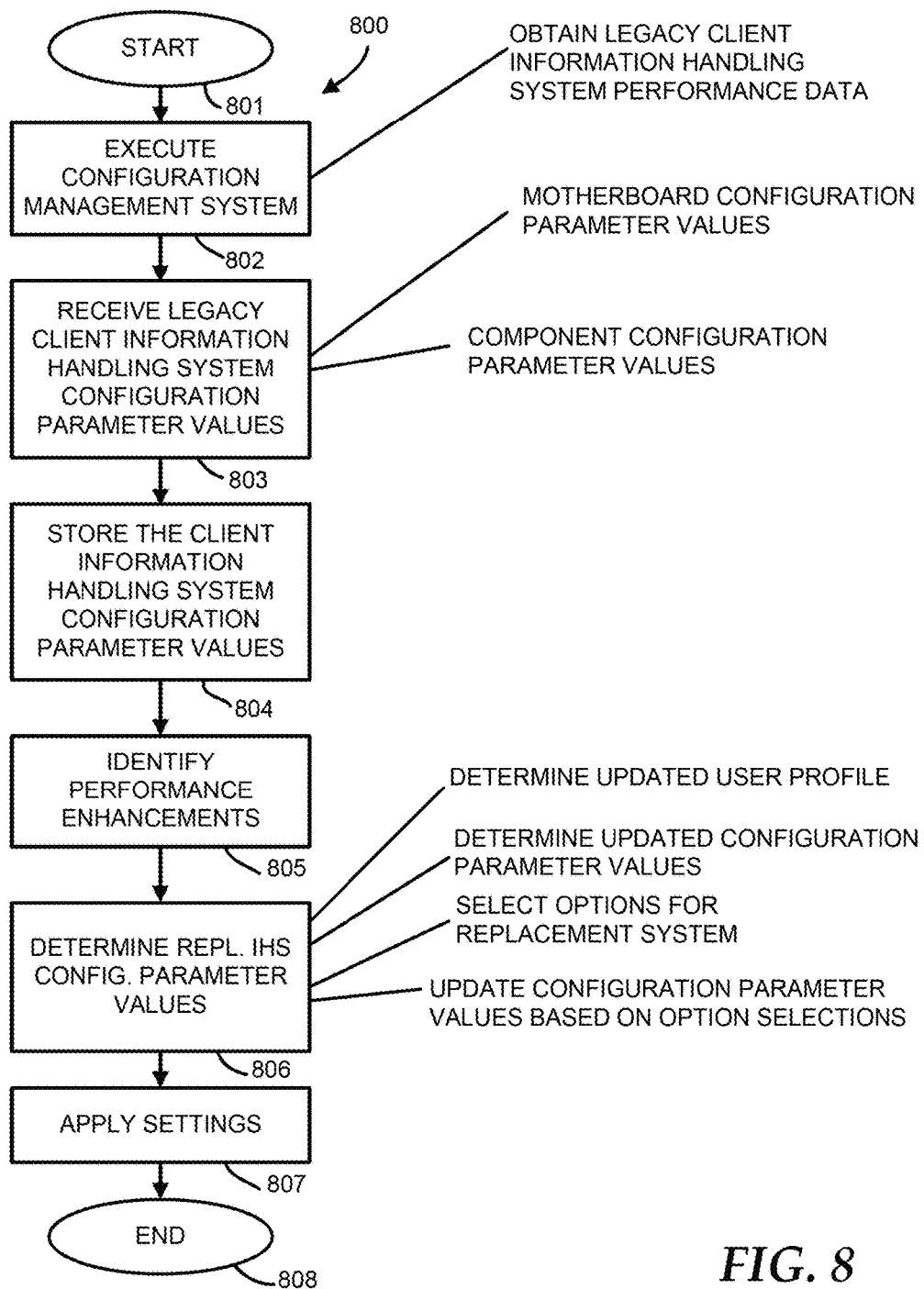
FIG. 8 is a flow diagram illustrating a method of information handling system configuration management according to an embodiment of the present disclosure.

FIG. 8 is a flow diagram illustrating a method of information handling system configuration management according to an embodiment of the present disclosure. Method 800 begins at block 801 and continues to block 802. In block 802, an application processor executes instructions of a configuration management system to obtain legacy client information handling system performance data of a legacy client information handling system. In accordance with at least one embodiment, the application processor determines a statistical model of performance estimation for a plurality of other client information handling systems. From block 802, method 800 continues to block 803. At block 803, a network adapter receives, at the management information handling system, legacy client information handling system configuration parameter values of the legacy client information handling system, which is to be replaced by a replacement client information handling system. As examples, information handling system configuration parameter values can include motherboard configuration parameter values and component configuration parameter values of the legacy information handling system. From block 803, method 800 continues to block 804. At block 804, a memory device stores the legacy client information handling system configuration parameter values. From block 804, method 800 continues to block 805. At block 805, the application processor calculates client information handling system performance based on the information handling system configuration parameter values, creates the statistical model of performance estimation, and identifies performance enhancements to be provided by the replacement information handling system relative to the performance of the legacy information handling system. From block 805, method 800 continues to block 806. At block 806, the application processor determines replacement information handling system configuration parameter values for the replacement information handling system and provides a configuration indication for the replacement client information handling system, the configuration indication indicative of a replacement information handling system configuration parameter value for use in a replacement information handling system. From block 806, method 800 continues to block 807. In block 807, the application processor causes the replacement information handling system configuration parameter values to be applied to the settings of the replacement information handling system configuration parameters of the replacement information handling system. From block 807, method 800 continues to block 808, where method 800 ends.

Figure 9:
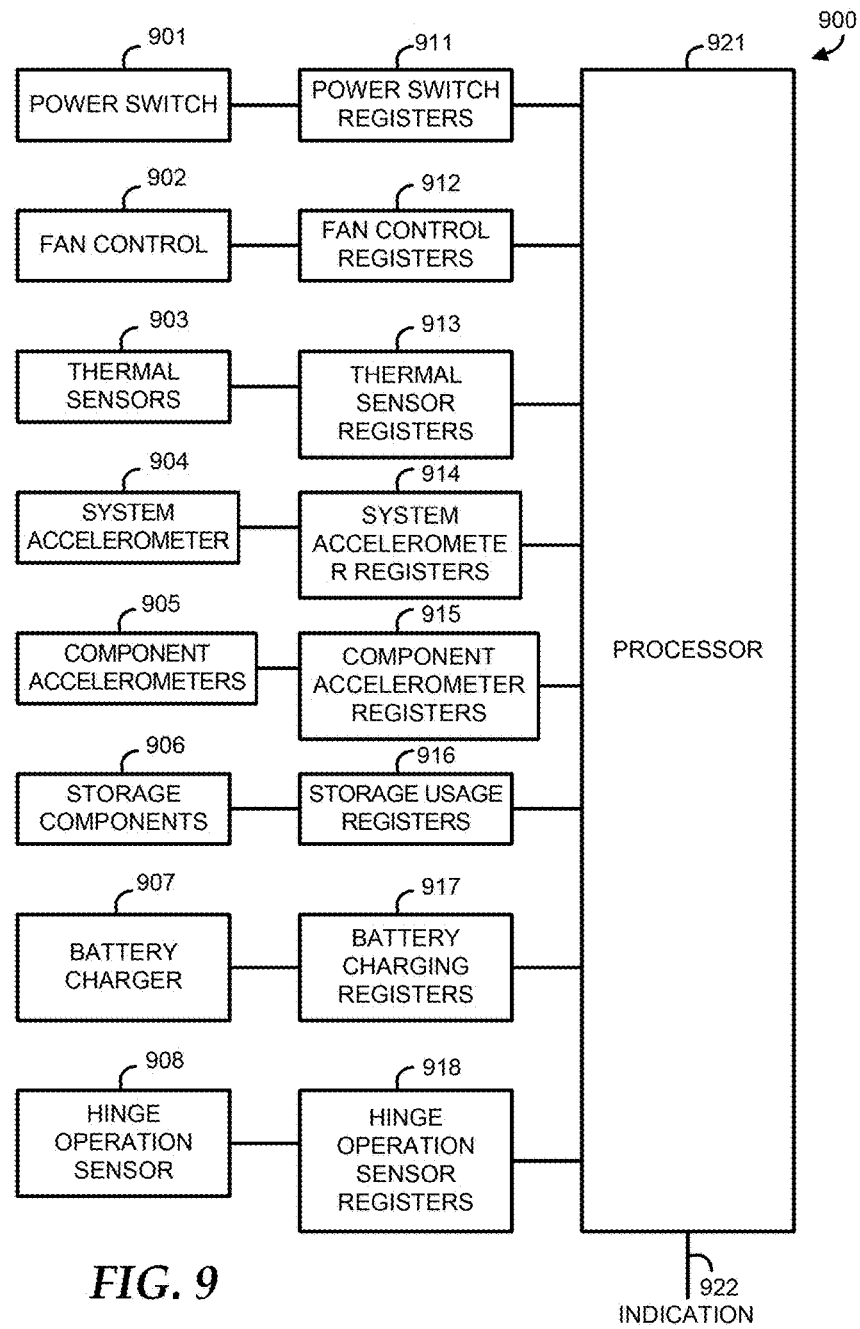
FIG. 9 is a graphical chart illustrating an example of a client information handling system architecture for configuration parameter value determination for client information handling systems according to an embodiment of the present disclosure.

FIG. 9 is a graphical chart illustrating an example of a client information handling system architecture for performance estimation and configuration parameter value determination for client information handling systems according to an embodiment of the present disclosure. An example of a client information handling system 900 in accordance with such an embodiment comprises power switch 901, fan control 902, thermal sensors 903, system accelerometer 904, component accelerometers 905, storage components 906, battery charger 907, hinge operation sensor 908 as sensors and other data sources. Client information handling system 900 comprises power switch registers 911, fan control registers 912, thermal sensor registers 913, system accelerometer registers 914, component accelerometer registers 915, storage usage registers 916, battery charging registers 917, and hinge operation sensor registers 918 as data registers. Client information handling system 900 comprises processor 921, which monitors the sensors and other data sources via their respective registers and provides indication 922. Information from sensors and other sources 901-908 of a legacy information handling system, as can be obtained by processor 921 via registers 911-918, can be used to provide indications, such as indication 922, of replacement information handling system configuration parameter values to be applied to settings of replacement information handling system configuration parameters of a replacement information handling system to optimize performance of the replacement information handling system.

In accordance with at least one embodiment, a method, at a management information handling system, comprises executing, via an application processor, instructions of a system configuration management system to obtain legacy client information handling system performance data of a legacy client information handling system, identifying, at the management information handling system, legacy client information handling system performance constraints imposed by the legacy client information handling system, receiving, at the management information handling system, legacy client information handling system configuration parameter values of the legacy client information handling system, information handling system configuration parameter values comprising motherboard configuration parameter values and component configuration parameter values, storing the legacy client information handling system configuration parameter values in a memory device, identifying, at the management information handling system, replacement client information handling system performance enhancements relative to the legacy client information handling system performance constraints based on improved replacement client information handling system capabilities and capacities relative to legacy client information handling system capabilities and capacities, determining replacement client information handling system configuration parameter values based on the legacy client information handling system configuration parameter values and the replacement client information handling system performance enhancements, applying settings of the replacement client information handling system configuration parameter values to a replacement client information handling system to configure the replacement client information handling system to operate according to the replacement client information handling system configuration parameter values. In accordance with at least one embodiment, the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate. In accordance with at least one embodiment, the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size. In accordance with at least one embodiment, the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state. In accordance with at least one embodiment, the at least one sleep state is selected from a group consisting of a hibernation state and a deeper sleep state. In accordance with at least one embodiment, the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value. In accordance with at least one embodiment, the increased nits display configuration parameter value provides an improved performance selected from a group consisting of a brightness parameter value and a video memory utilization.

In accordance with at least one embodiment, a management information handling system comprises an application processor executing instructions executing instructions of a system configuration management system to obtain legacy client information handling system performance data of a legacy client information handling system and to identify, at the management information handling system, legacy client information handling system performance constraints imposed by the legacy client information handling system, a network adapter for receiving, from a client information handling system, to receive, at the management information handling system, legacy client information handling system configuration parameter values of the legacy client information handling system, information handling system configuration parameter values comprising motherboard configuration parameter values and component configuration parameter values, and a memory device to store the legacy client information handling system configuration parameter values in a memory device, wherein the management information handling system is configured to identify, at the management information handling system, replacement client information handling system performance enhancements relative to the legacy client information handling system performance constraints based on improved replacement client information handling system capabilities and capacities relative to legacy client information handling system capabilities and capacities, to determine replacement client information handling system configuration parameter values based on the legacy client information handling system configuration parameter values and the replacement client information handling system performance enhancements, and to apply settings of the replacement client information handling system configuration parameter values to a replacement client information handling system to configure the replacement client information handling system to operate according to the replacement client information handling system configuration parameter values. In accordance with at least one embodiment, the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate. In accordance with at least one embodiment, the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size. In accordance with at least one embodiment, the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state. In accordance with at least one embodiment, the at least one sleep state is selected from a group consisting of a hibernation state and a deeper sleep state. In accordance with at least one embodiment, the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value. In accordance with at least one embodiment, the increased nits display configuration parameter value provides an improved performance selected from a group consisting of a brightness and a video memory utilization.

In accordance with at least one embodiment, a replacement client information handling system comprises a network adapter configured to receive, at the replacement client information handling system, legacy client information handling system configuration parameter values of the legacy client information handling system, the legacy client information handling system configuration parameter values comprising motherboard configuration parameter values and component configuration parameter values, and to obtain legacy client information handling system performance data of a legacy client information handling system, a memory device to store the legacy client information handling system configuration parameter values, an application processor configured to instructions of a system configuration management system to identify legacy client information handling system performance constraints imposed by the legacy client information handling system, to identify replacement client information handling system performance enhancements relative to the legacy client information handling system performance constraints based on improved replacement client information handling system capabilities and capacities relative to legacy client information handling system capabilities and capacities, to determine, at the replacement client information handling system, replacement client information handling system configuration parameter values based on the legacy client information handling system configuration parameter values and the replacement client information handling system performance enhancements, and to apply settings of the replacement client information handling system configuration parameter values to the replacement client information handling system to configure the replacement client information handling system to operate according to the replacement client information handling system configuration parameter values. In accordance with at least one embodiment, the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate. In accordance with at least one embodiment, the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size. In accordance with at least one embodiment, the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state. In accordance with at least one embodiment, the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value. In accordance with at least one embodiment, the increased nits display configuration parameter value provides an improved performance selected from a group consisting of a brightness and a video memory utilization.

While embodiments have been described herein with respect to specific types of client information handling system performance parameter sensors, such as power sensors, duty cycle sensors, thermal stress sensors, system storage condition sensors, mechanical stress sensors, other embodiments may be applied to other types of interfaces. For example, if it is desirable to provide other or additional types of interfaces, an embodiment using such other or additional types of interfaces may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, at a management information handling system, comprising:
    identifying, at the management information handling system, legacy client information handling system performance constraints imposed by the legacy client information handling system;
    receiving, at the management information handling system, legacy client information handling system performance data of a legacy client information handling system;
    receiving, at the management information handling system, legacy client information handling system configuration parameter values of the legacy client information handling system, information handling system configuration parameter values comprising motherboard configuration parameter values and component configuration parameter values;
    storing the legacy client information handling system configuration parameter values in a memory device;
    identifying, at the management information handling system, replacement client information handling system performance enhancements relative to the legacy client information handling system performance constraints;
    executing, via an application processor, instructions of a system configuration management system to determine replacement client information handling system configuration parameter values based on the legacy client information handling system configuration parameter values and the replacement client information handling system performance enhancements.

2. The method of claim 1 wherein the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate.

3. The method of claim 1 wherein the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size.

4. The method of claim 1 wherein the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state.

5. The method of claim 1 further comprising:
transmitting settings of the replacement client information handling system configuration parameter values to a replacement client information handling system to configure the replacement client information handling system to operate according to the replacement client information handling system configuration parameter values.

6. The method of claim 1 wherein the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value.

7. The method of claim 6 wherein the increased nits display configuration parameter value provides an improved performance selected from a group consisting of a brightness and a video memory utilization.

8. A management information handling system comprising:
an application processor executing instructions executing instructions of a system configuration management system:
to obtain legacy client information handling system performance data of a legacy client information handling system, and
to identify, at the management information handling system, legacy client information handling system performance constraints imposed by the legacy client information handling system;
a network adapter for receiving, from a client information handling system, to receive, at the management information handling system, legacy client information handling system configuration parameter values of the legacy client information handling system, information handling system configuration parameter values comprising motherboard configuration parameter values and component configuration parameter values;
a memory device to store the legacy client information handling system configuration parameter values in a memory device, wherein the management information handling system is configured:
to identify, at the management information handling system, replacement client information handling system performance enhancements relative to the legacy client information handling system performance constraints,
to determine replacement client information handling system configuration parameter values based on the legacy client information handling system configuration parameter values and the replacement client information handling system performance enhancements.

9. The management information handling system of claim 8 wherein the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate.

10. The management information handling system of claim 8 wherein the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size.

11. The management information handling system of claim 8 wherein the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state.

12. The management information handling system of claim 8 further configured to transmit settings of the replacement client information handling system configuration parameter values to a replacement client information handling system to configure the replacement client information handling system to operate according to the replacement client information handling system configuration parameter values.

13. The management information handling system of claim 8 wherein the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value.

14. The management information handling system of claim 13 wherein the increased nits display configuration parameter value provides an improved performance selected from a group consisting of a brightness and a video memory utilization.

15. A replacement client information handling system comprising:
a network adapter configured to receive, at the replacement client information handling system, legacy client information handling system configuration parameter values of the legacy client information handling system, the legacy client information handling system configuration parameter values comprising motherboard configuration parameter values and component configuration parameter values, and to obtain legacy client information handling system performance data of a legacy client information handling system;
a memory device to store the legacy client information handling system configuration parameter values;
an application processor configured to execute instructions of a system configuration management system:
to identify legacy client information handling system performance constraints imposed by the legacy client information handling system, to identify replacement client information handling system performance enhancements relative to the legacy client information handling system performance constraints, to determine, at the replacement client information handling system, replacement client information handling system configuration parameter values based on the legacy client information handling system configuration parameter values and the replacement client information handling system performance enhancements.

16. The replacement information handling system of claim 15 wherein the legacy client information handling system configuration parameter values comprise an indication of a need for fast charging a battery and the replacement client information handling system performance enhancements are based, at least in part, on an improved replacement client information handling system battery charging rate relative to legacy client information handling system battery charging rate.

17. The replacement information handling system of claim 15 wherein the legacy client information handling system performance data comprise legacy client information handling system cache utilization data and the replacement client information handling system performance enhancements are based, at least in part, on an improved storage drive selected from a group consisting of a solid state drive (SSD) and a hybrid drive, wherein the hybrid drive comprises flash memory and a rotating disk platter, and the replacement client information handling system configuration parameter values comprise a replacement client information handling system cache size.

18. The replacement information handling system of claim 15 wherein the legacy client information handling system performance data comprise a legacy client information handling system usage data, the replacement client information handling system performance enhancements comprise improved power consumption and the replacement client information handling system configuration parameter values comprise a replacement client information handling system sleep setting to reduce time spent in at least one sleep state.

19. The replacement information handling system of claim 15 wherein the legacy client information handling system configuration parameter values comprise a legacy client information handling system display brightness parameter value, the replacement client information handling system performance enhancements comprise an improved display brightness capability, and the replacement client information handling system configuration parameter values comprise an increased nits display configuration parameter value.

20. The replacement information handling system of claim 15 wherein the replacement information handling system is configured to transmit settings of the replacement client information handling system configuration parameter values to the replacement client information handling system to configure the replacement client information handling system to operate according to the replacement client information handling system configuration parameter values.

* * * * *